United States Patent [19]

Loseries

[11] Patent Number: 4,514,076
[45] Date of Patent: Apr. 30, 1985

[54] PHOTOGRAPHIC CAMERA

[75] Inventor: Peter Loseries, Wetzlar-Nauborn, Fed. Rep. of Germany

[73] Assignee: Ernst Leitz Wetzler GmbH, Wetzlar, Fed. Rep. of Germany

[21] Appl. No.: 563,595

[22] Filed: Dec. 20, 1983

[30] Foreign Application Priority Data

Dec. 23, 1982 [DE] Fed. Rep. of Germany ....... 3247764

[51] Int. Cl.³ ............................................. G03B 7/099
[52] U.S. Cl. .................................................. 354/481
[58] Field of Search .................... 354/476, 478–481, 354/152

[56] References Cited

U.S. PATENT DOCUMENTS 3,523,497  8/1970  Holle ................................... 354/479
4,181,412  1/1980  Holle et al. ......................... 354/479

Primary Examiner—William B. Perkey
Attorney, Agent, or Firm—Schwartz, Jeffery, Schwaab, Mack, Blumenthal & Koch

[57] ABSTRACT

A photographic finder camera adapted to use interchangeable photographic lens objectives and having a photoelectric detector system for measuring the light flux passing through the photographic lens objective employed in each case. At least one movably mounted optical component is disposed in the camera housing which component directs at least a part of the light flux coming from the object to be measured and passing through the lens objective to the photoelectric detector system. Control means are provided to selectively move this optical component into the measurement position in the beam path of the camera lens objective and depending on the actuation of the shutter, to transfer the optical component into a non-use position.

9 Claims, 4 Drawing Figures

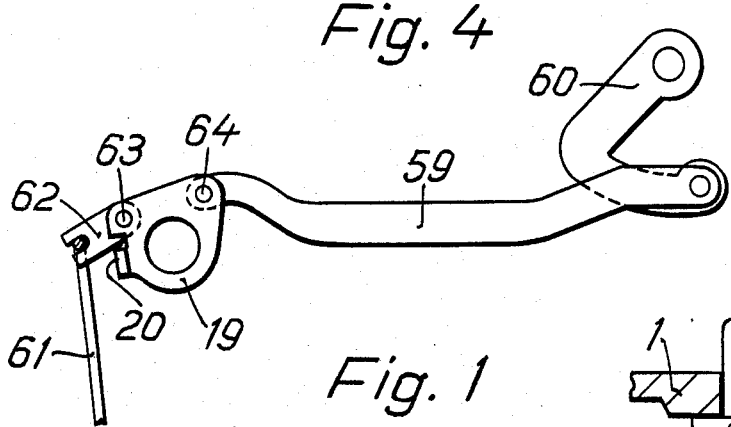
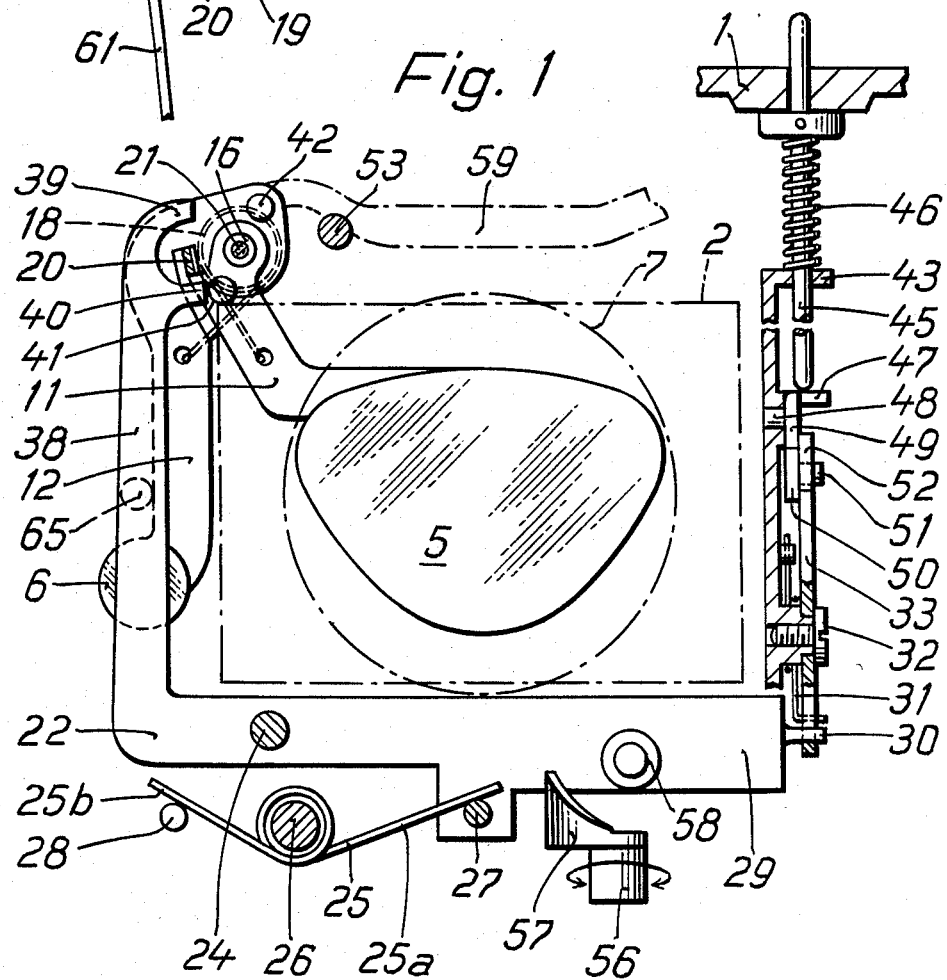

PHOTOGRAPHIC CAMERA

BACKGROUND OF THE INVENTION

The present invention relates to a photographic finder camera with interchangeable photographic lens objectives and with a photoelectric detector system for measuring the light flux passing through the photographic lens objective employed in each case.

For example it is known from the German Pat. Nos. 12 05 821 and 12 59 695 to perform the light measurement in photographic finder cameras behind the photographic lens objective and to dispose for this purpose a photoelectric converter in the beam path between the rear lens face of the photographic objective and the film plane. Usually the converter is attached to a carrier which is connected via drives to the camera shutter release in such a way that upon actuation of the camera shutter it is removed from the path of the beam immediately before the release of the shutter and after illumination of the film is finished, it is returned to its measurement position. To protect the photoelectric detector against damage by rough and improper handling, the detector may be first transferred upon insertion of the photographic objective from a blocked non-use position into the use position or measurement position and the blocking of the converter may be released by a control member at the start of the action of the shutter.

It is a disadvantage of such a finder camera that the light measuring device disposed in such a camera measures only a small part of the picture-forming light flux, which is equal for all photographic lens objectives, because the photoelectric detector of such a camera is disposed in front of the picture (film) plane and is provided with only a narrowly limited light sensitive area. In addition, a selective (spot) light measurement cannot be carried out with the above-described system.

SUMMARY OF THE INVENTION

Therefore it is the object of the present invention to provide a finder camera in which the light measurement device receives sufficient energy from the light flux passing in each case through the photographic lens objective that for each photographic lens objective employed, an integral and also a selective light measurement may be carried out as desired.

The object is achieved by providing a finder camera adapted to utilize interchangeable photographic lens objectives and having a shutter and a photoelectric detector system for measuring the light flux passing through the photographic lens objective being utilized, wherein (a) the photoelectric detector system is mounted in a plane, in which a representative light flux can be collected from various picture heights and all apertures of the photographic lens objective being utilized, (b) at least one of the optical components in the camera housing is movably disposed, said movable component directing when in a use position at least part of the light flux coming from the object to be measured and passing through the photographic lens objective being utilized, to the photoelectric receiver system, and (c) control means are provided which selectively bring said movable optical component into the use position in the beam path of the photographic lens objective and transfer the optical component into a non-use position depending on actuation of the camera shutter.

Further advantageous features and embodiments of the invention include providing two movable optical components and means for selectively locking one of them in a non-use position; providing two movable optical components of different size for effecting different types of light measurements; providing manually actuable means for moving one or the other of the optical elements into the beam path of the lens objective; constructing the optical elements as parabolic-mirror-like Fresnel step lenses provided with spherical impressions; and arranging the optical elements such that an intensity balancing is effected between the beams reflected through a greater distance and those reflected through a lesser distance to the photoelectric detector system.

BRIEF DESCRIPTION OF THE DRAWINGS

The invention will be described in greater detail with reference to a preferred embodiment illustrated in the accompanying drawings in which:

FIG. 1 is a schematic rear view of a photographic finder camera according to the invention;

FIG. 4 shows a connecting rod system for switching the light measurment device between integral exposure measurement and selective exposure measurement.

DETAILED DESCRIPTION OF A PREFERRED EMBODIMENT

Figure 2:
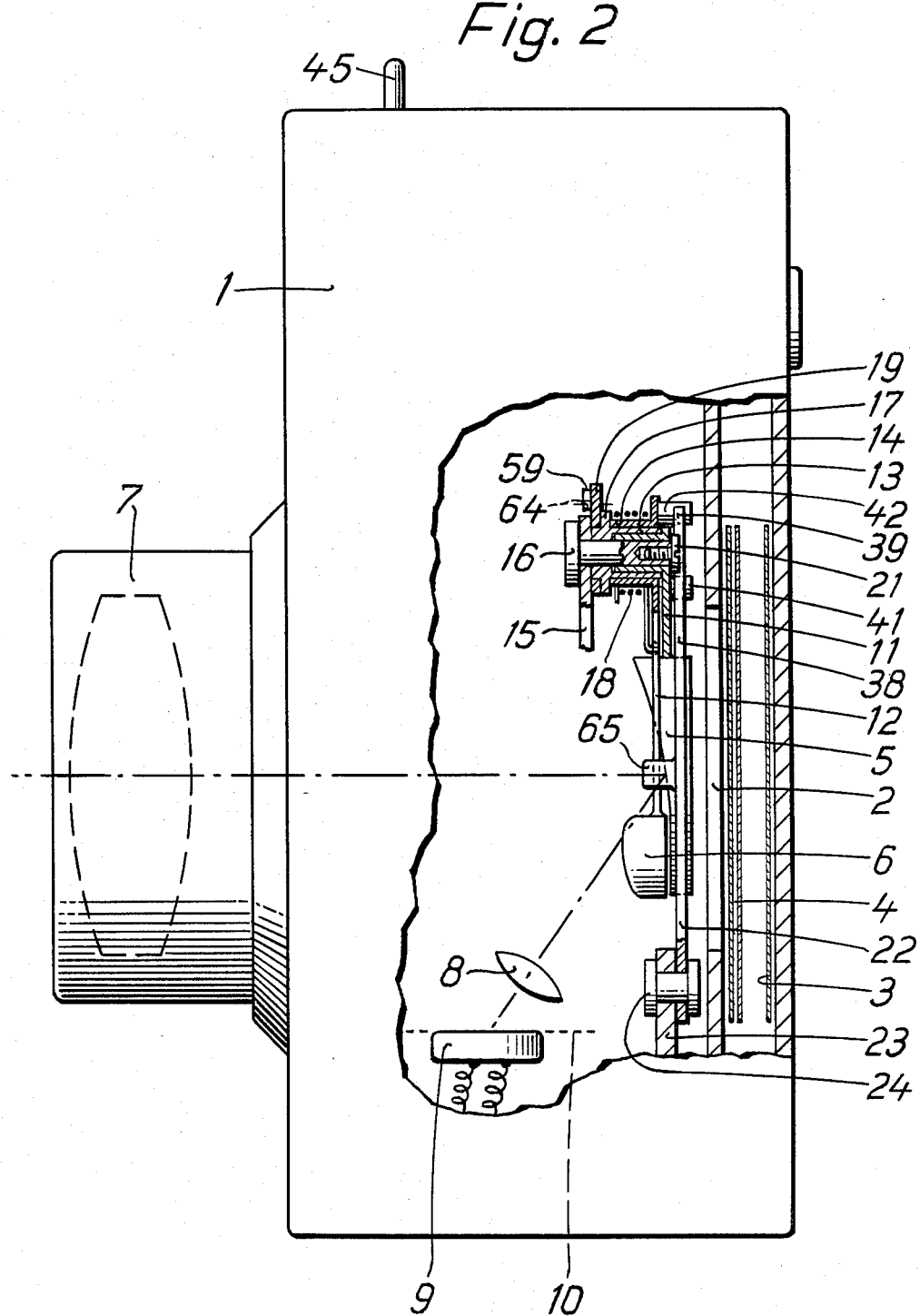
FIG. 2 is a partially sectional side view of the camera of FIG. 1.

The housing 1 of a finder camera schematically shown in FIGS. 1 and 2 includes a camera aperture 2 behind which a photographic shutter 4 is disposed in front of film 3. As desired, parabolic-mirror-like reflectors 5 and 6 can be pivoted in front of the camera aperture 2 for integral or selective light measurement. The reflectors may be planar reflectors in the form of Fresnel step lenses as described in published German Patent Application DE-OS No. 27 05 300. The reflectors are provided with spherical impressions which are impressed into the steps and function as concave mirrors. As most clearly seen from FIG. 1 of the drawings, reflector 5 has the approximate shape of a triangle with strongly rounded corners, while reflector 6 is smaller and has a generally circular configuration.

The light flux coming from the object to be measured and passing through the photographic lens objective, which is twisted onto the housing 1, is redirected in each case by one or the other of reflectors 5 and 6 disposed in front of the camera aperture 2, and after passing through a collector lens 8 strikes a photoelectric detector system 9, which is arranged in a plane 10.

The arrangement of the steps and the ball impressions on the reflectors 5, 6 is made in such a way that an intensity balancing occurs between the beams reflected through a greater or a lesser distance to the photoelectric detector system 9.

In order to be able to bring the reflectors 5 or 6 as desired in front of the camera aperture 2, a support lever 11 or 12 is associated with each of the reflectors 5 and 6. One end of each support lever 11 or 12 is directly attached to the associated reflector 5 or 6, respectively. The other ends are mounted concentrically by means of mounting bushings 13 and 14, respectively, rotatable around an axis 16 disposed on an intermediate wall 15 of the camera housing 1.

An intermediate sleeve 17 is inserted in order to decrease the friction between the bearing bushings 13, 14 such that the support levers 11 and 12, pivoting around the axis 16, do not have a common bearing surface.

A torsion spring 18 disposed around the outer circumference of the mounting bushing 14 and engaging the support levers 11 and 12, urges the support levers 11 and 12, and thus the reflectors 5 and 6, against each other. A molded lever 19 mounted on the left end of the intermediate sleeve 17 engages an angled mechanical stop piece 20 between the support levers 11 and 12 and assures a predetermined spacing between the support levers 11 and 12 (FIG. 1 and FIG. 2). The size of the angled mechanical stop piece is chosen such that in any case only one reflector 5 or 6 can be disposed in the camera aperture 2. A screw 21 secures the mounting bushings 13, 14, the axis 16, the intermediate sleeve 17 and the torsion spring 18 in the axial direction.

The pivoting of the reflectors 5 or 6 into the light flux coming from the object to be measured and passing through the photographic lens objective 7 is controlled by an angle lever 22. The angle lever 22 is rotatably mounted for this purpose on an axis 24 (FIG. 2) secured to an intermediate wall 23 of the camera housing 1, and the angle lever 22 is pivoted by the force of a torsion spring 25, which is disposed around a pin 26. One end 25a of the spring 25 engages a rivet 27 attached to the angle lever 22 while the other end 25b of the spring is supported by a pin 28 attached to the housing.

An arm 29 of the angle lever 22 is provided with a catch nose 30. A detent pawl 33 (FIG. 3), which pivots around an axis 32 and is subjected to the force of a pre-stressed torsion spring 31, engages the rear of catch nose 30.

Figure 3:
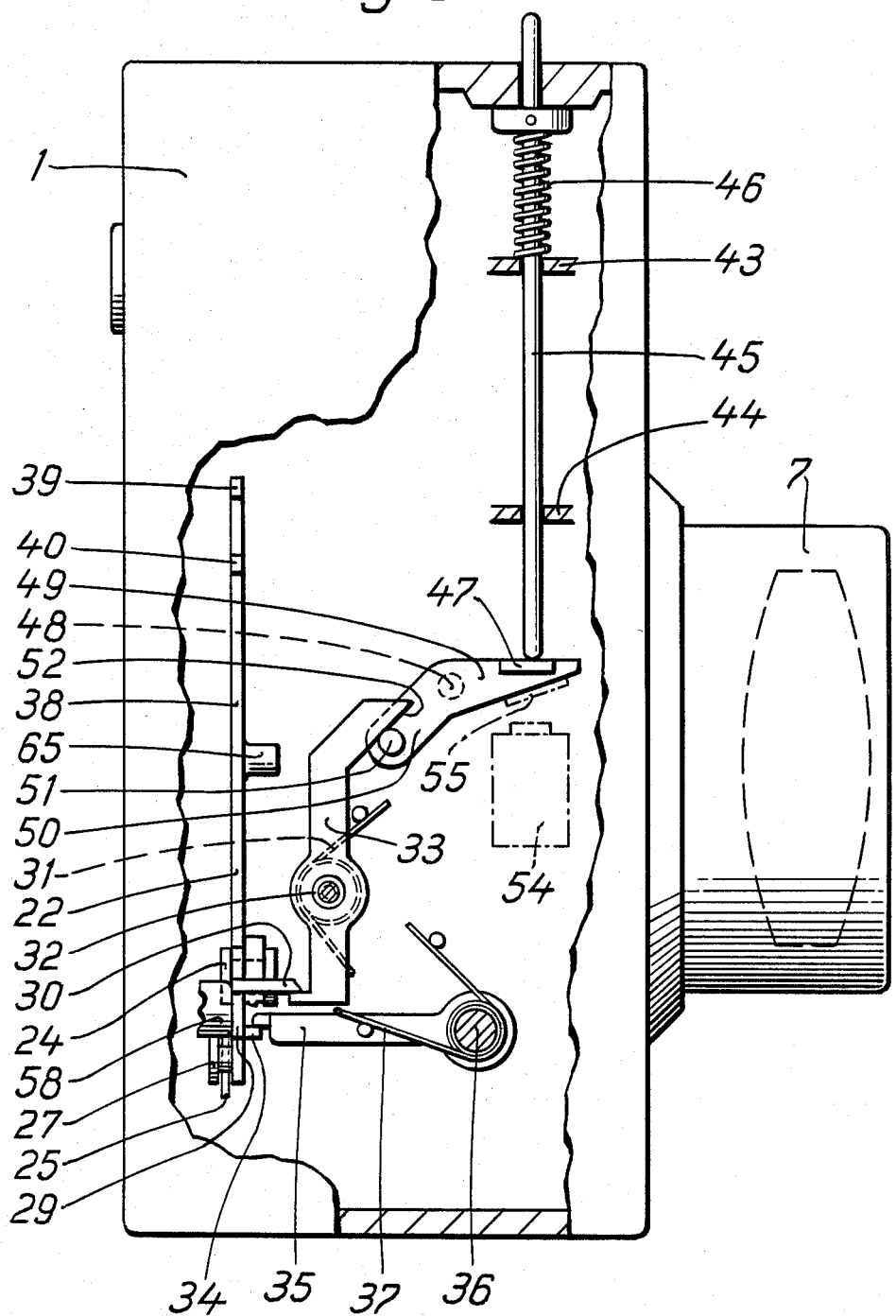
FIG. 3 is a detail view of the lever controlling the reflectors.

The arm 29 of the angle lever 22 is also provided with a further catch nose 34 (FIG. 3). This catch nose 34 cooperates with a detent pawl 35 which is fixedly mounted on a pivotable shaft 36 which in turn is connected to the drive (not shown in the drawing) of the camera shutter system 4, and the catch nose 34 is pivoted under the pressure of a torsion spring 37.

Another arm 38 of the angle lever 22 is formed with a fork at its end. The fork ends 39 and 40 extend around axis 16 when the angle lever 22 is pivoted. Depending on the reflector setting in each case, the fork ends 39 or 40 cooperate with stud pins 41 or 42, which are mounted on the support levers 11 and 12, respectively.

Assuming that the reflector 5 is activated for integral light measurement, then the above described arrangement operates as follows:

Upon release of the shutter, a release pin 45, which is longitudinally guided in bearing blocks 43 and 44, is pressed against the force of a compression spring 46 against a lever arm 47 of an angle lever 49 which is pivotable around an axis 48. A slide pin 51 is mounted on the upwardly pivoting arm 50 of the angle lever 49. Slide pin 51 slides along an angled face 52 of the detent pawl 33 and releases the detent pawl 33 against the force of the torsion spring 31 from the catch nose 30. The angle lever 22 is thereby released and is now pivoted by the torsion spring 25. As a result of this pivoting action, the angle lever 22 is pressed against stud pin 41. Upon overcoming of the torsion spring 18 the reflector 5 is pushed out of the camera aperture 2 until the support lever 11 rests adjacent a mechanical stop 53 (FIG. 1).

After the reflector 5 has been pivoted out of the camera aperture 2, the other catch nose 34 of the angle lever 22 releases the detent pawl 35. The pivoting of detent pawl 35 initiates the operation of the first curtain of the camera shutter 4.

In the case of an electric release, the release pin 45 actuates a microswitch (not shown) and activates a magnet 54 (shown with broken lines in FIG. 3) so that an armature plate 55 attached to the angle lever 49 is attracted toward the magnet. The angle lever 49 pivots, and the reflector 5 swings away from as described above.

In the case of an automatic release, the current is switched to the magnet 54 by a microprocessor (not shown) after the microprocessor has determined the values required for exposing the film.

The return swing of the reflector 5 can be initiated either by the second shutter curtain after its operation is completed or by hand by means of a winding lever (not shown) of the camera.

When the reflector 5 swings back, a shaft 56, which has a curved piece 57 disposed at its upper end, is caused to rotate. As a result of the rotation of the shaft 56, the curved piece 57 pivots against a sliding roller 58 on the arm 29 of the angle lever 22 and presses the angle lever 22 against the force of the torsion spring 25 back into its starting position. Thereby the fork end 40 moves back and the torsion spring 18 shifts the support lever 11 with the reflector 5 attached to it back to the mechanical stop piece 20. Because of the force of the torsion spring 31, the detent pawl 33 falls behind the catch nose 30, and the catch lever 35 runs up onto the other catch nose 34, whereby the shutter is closed until the next time a photograph is taken.

The actuation and movement of the reflector 6 into the light flux coming from the object to be photographed is effected by means of an adjusting knob (not shown) disposed on the camera housing 1 via a pair of connecting rods 59 and 60, shown in detail in FIG. 4, and via a dead point connection mounted on axis 63, which dead point connection comprises a bar spring 61 and an articulated lever 62. The dead point connection is mounted at one end of the molded lever 19.

The connecting rod 59 pivotally engages an axle 64 attached to the other end of the molded lever 19 which results in rotation of the molded lever 19 (and thereby also in a shift in the position of the mechanical stop 20) in the counterclockwise direction. Since the levers 11 and 12 are held against the mechanical stop 20 by the force of the torsion spring 18, they pivot along with the stop at the same time. The reflector 5 swings away from the camera aperture 2 and the reflector 6 is activated. At the same time the stud pin 41 moves away from the fork end 40 of the angle lever 22 and the stud pin 42 rests against fork end 39 so that when the shutter is released reflector 6 is now pivoted out of the photographic aperture.

As described above, after the release of the camera shutter, the angle lever 22 is pivoted by the pressure of the torsion spring 25. Fork end 39 engages the stud pin 42 and pushes the reflector 6 clockwise out the photographic aperture 2 until the support lever 12 engages a mechanical stop 65 (FIG. 1). The return of the reflector 6 to the front of the camera aperture 2 is performed in the same way as described above for reflector 5.

The particular advantage of the new camera lies in the presence of different reflectors for the two types of exposure measurements (integral and selective), which reflectors in each case assure the correct transmission of the light flux to the photoelectric detector system 9.

The arrangement is so designed thereby that, in case of a malfunction, the reflectors are disposed in different storage areas of the camera.

Variations of the above-described arrangement are possible. For example the reflectors 5 and 6 can cooperate with different photoelectric detector systems, whereby the one detector system can be coordinated to the selective type of measurement and the other detector system to the integral type of measurement.

It is also possible to provide the finder camera with only one reflector, and to interpose at least one group of optical components in front of the photoelectric detector system, which components, depending on their relative position to the photoelectric detector system, provide the detector system with an integral-relevant or a selective-relevant measurement.

The foregoing description has been set forth merely as an illustrative example of the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. A photographic finder camera, adapted to utilize interchangeable photographic lens objectives and having a shutter and a photoelectric detector system for measuring light flux passing through the photographic lens objective being utilized, wherein:
   (a) the photoelectric detector system is mounted in a plane in which a representative light flux can be collected from various image heights and all apertures of the photographic lens objective being utilized;
   (b) at least one optical component is movably disposed in the camera housing, said movable component being pivoted in front of the aperture of said camera parallel to a plane defined by film in the camera and directing when in a use position in the beam path of said photographic lens objective at least part of the light flux coming from the object to be measured and passing through the photographic lens objective, to the photoelectric detector system; and
   (c) control means are provided which selectively bring said movable optical component into the use position and transfer the optical component into a non-use position depending on actuation of the camera shutter.

2. A photographic camera according to claim 1 wherein two optical components pivotable in front of the aperture of said camera and movable parallel to the film plane of the camera are disposed in the camera housing, which optical components in each case direct at least a part of the light flux coming from the object to be measured and passing through the photographic lens objective being utilized to the photoelectric detector system, and control means and locking means are provided which, depending on the actuation of the camera shutter, selectively transfer one of said optical components into a non-use position and secure the other optical component in a non-use position, respectively.

3. A photographic camera according to claim 2 wherein said two movable optical components are provided with different dimensions to carry out different kinds of light measurement.

4. A photographic camera according to claim 2 further comprising manually actuatable means for selectively moving one or the other of said optical components into the beam path of the photographic lens objective.

5. A photographic camera according to claim 1 wherein said optical component comprises a reflector.

6. A photographic camera according to claim 5 wherein said reflector comprises a parabolic-mirror-like Fresnel step lens provided with sperical impressions impressed into the steps which act as concave mirrors.

7. A photographic camera according to claim 6 wherein the arrangement of the steps and of the spherical impressions of the step lens is such that an intensity balancing is effected between the beams reflected through a greater distance and the beams reflected through a lesser distance to the photoelectric detector system.

8. A photographic camera according to claim 7 wherein two photoelectric detector systems and two selectively movable optical components are provided, one of said detector systems cooperating with one of said optical components when said one component is disposed in a measurement position and the other of said photoelectric detector systems cooperating with the other of said optical components when said other component is disposed in a measurement position.

9. A photographic camera according to claim 2 wherein at least one of said optical components has the shape of a triangle with strongly rounded corners.

* * * * *